(12) United States Patent
Diaz et al.

(10) Patent No.: US 11,464,212 B1
(45) Date of Patent: Oct. 11, 2022

(54) BIRD FEEDER WITH A LOWER SEED CATCHING TRAY

(71) Applicants: Richard Diaz, Merced, CA (US); Sandra Martin, Merced, CA (US)

(72) Inventors: Richard Diaz, Merced, CA (US); Sandra Martin, Merced, CA (US)

( * ) Notice: Subject to any disclaimer, the term of this patent is extended or adjusted under 35 U.S.C. 154(b) by 103 days.

(21) Appl. No.: 17/171,065

(22) Filed: Feb. 9, 2021

(51) Int. Cl.
*A01K 39/01* (2006.01)

(52) U.S. Cl.
CPC .................................... *A01K 39/01* (2013.01)

(58) Field of Classification Search
CPC ............................ A01K 39/0113; A01K 39/01
See application file for complete search history.

(56) References Cited

U.S. PATENT DOCUMENTS

| | | | | |
|---|---|---|---|---|
| 4,188,913 A * | 2/1980 | Earl | ................... | A01K 39/0113 |
| | | | | D30/127 |
| 4,829,934 A * | 5/1989 | Blasbalg | ............... | A01K 39/012 |
| | | | | D30/127 |
| 6,360,690 B1 * | 3/2002 | Canby | ................... | A01K 39/012 |
| | | | | 119/432 |
| 7,654,225 B2 | 2/2010 | Madsen | | |
| 7,886,695 B2 | 2/2011 | Held | | |
| 7,930,994 B2 | 4/2011 | Stone | | |
| D649,302 S | 11/2011 | Hickok | | |
| 8,413,605 B2 | 4/2013 | Baynaryd | | |
| D790,778 S | 6/2017 | Green | | |
| 2010/0258054 A1 * | 10/2010 | Frazier | ................. | A01K 39/012 |
| | | | | 119/52.2 |
| 2011/0259272 A1 | 10/2011 | Traska | | |
| 2014/0026817 A1 | 1/2014 | Diaz | | |
| 2015/0122157 A1 | 5/2015 | Cote | | |

FOREIGN PATENT DOCUMENTS

CA  2610527  5/2008

* cited by examiner

*Primary Examiner* — Yvonne R Abbott-Lewis
(74) *Attorney, Agent, or Firm* — Kyle A. Fletcher, Esq.

(57) ABSTRACT

The bird feeder with a lower seed catching tray comprises an upper feeder and a lower feeder. The top of the lower feeder may be coupled to the bottom of the upper feeder. The upper feeder may be stocked with bird seed. The upper feeder may be adapted to dispense the bird seed to one or more birds from a plurality of upper feeding stations located on an upper seed tube. The bird seed dropped by the one or more birds feeding at the upper feeder may be collected by an upper bowl of the upper feeder and may be funneled into the lower feeder where the bird seed may be dispensed a second time.

20 Claims, 4 Drawing Sheets

BIRD FEEDER WITH A LOWER SEED CATCHING TRAY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of bird feeders, more specifically, a bird feeder with a lower seed catching tray.

SUMMARY OF INVENTION

The bird feeder with a lower seed catching tray comprises an upper feeder and a lower feeder. The top of the lower feeder may be coupled to the bottom of the upper feeder. The upper feeder may be stocked with bird seed. The upper feeder may be adapted to dispense the bird seed to one or more birds from a plurality of upper feeding stations located on an upper seed tube. The bird seed dropped by the one or more birds feeding at the upper feeder may be collected by an upper bowl of the upper feeder and may be funneled into the lower feeder where the bird seed may be dispensed a second time.

An object of the invention is to dispense bird seed with minimal waste.

Another object of the invention is to collect bird seed that is dropped into an upper bowl A further object of the invention is to funnel the dropped bird seed into the lower feeder.

Yet another object of the invention is to dispense the dropped seed from the lower feeder.

These together with additional objects, features and advantages of the bird feeder with a lower seed catching tray will be readily apparent to those of ordinary skill in the art upon reading the following detailed description of the presently preferred, but nonetheless illustrative, embodiments when taken in conjunction with the accompanying drawings.

In this respect, before explaining the current embodiments of the bird feeder with a lower seed catching tray in detail, it is to be understood that the bird feeder with a lower seed catching tray is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bird feeder with a lower seed catching tray.

It is therefore important that the claims be regarded as including such equivalent construction insofar as they do not depart from the spirit and scope of the bird feeder with a lower seed catching tray. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
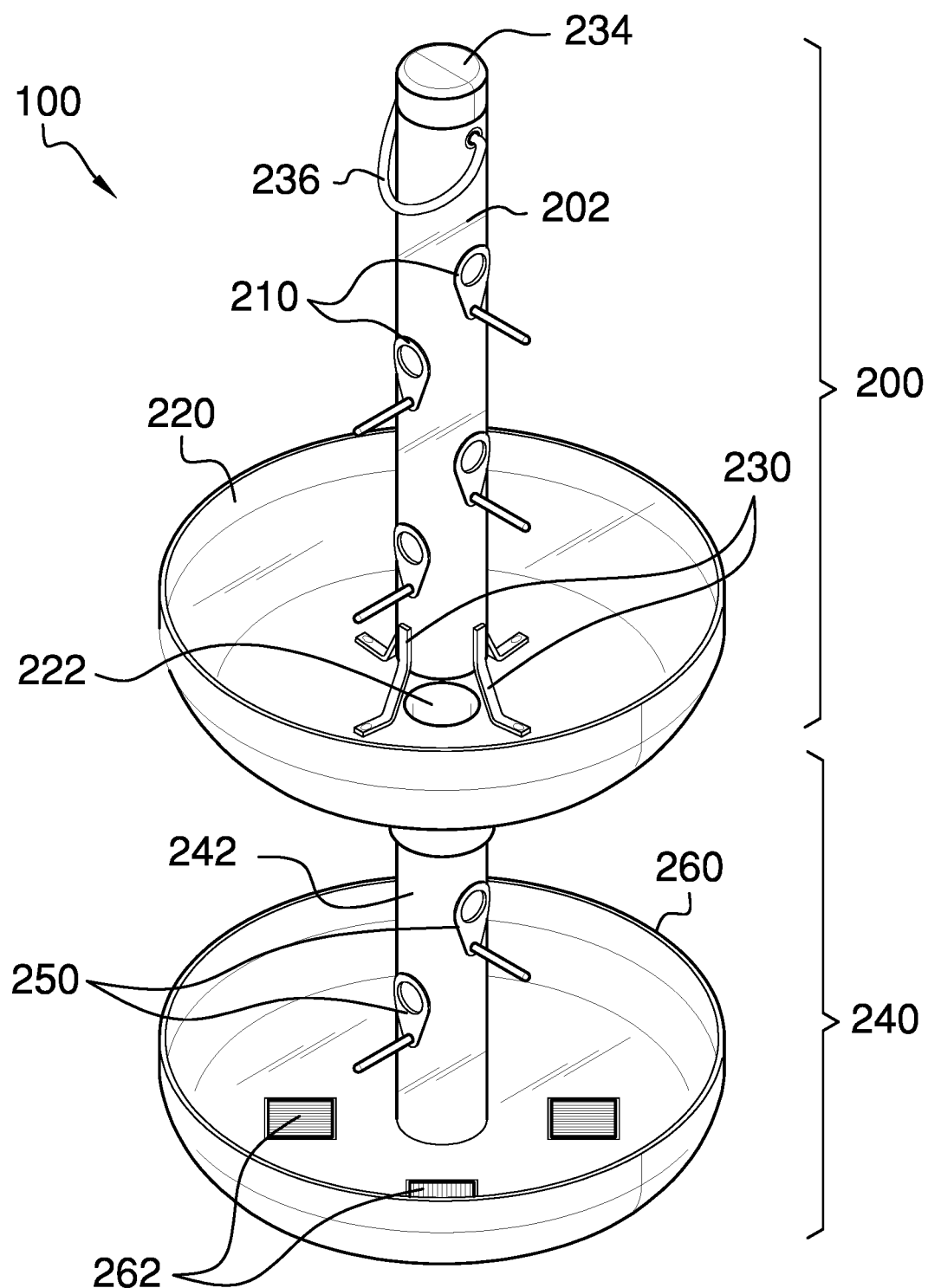
FIG. 1 is an isometric view of an embodiment of the disclosure.
Figure 2:
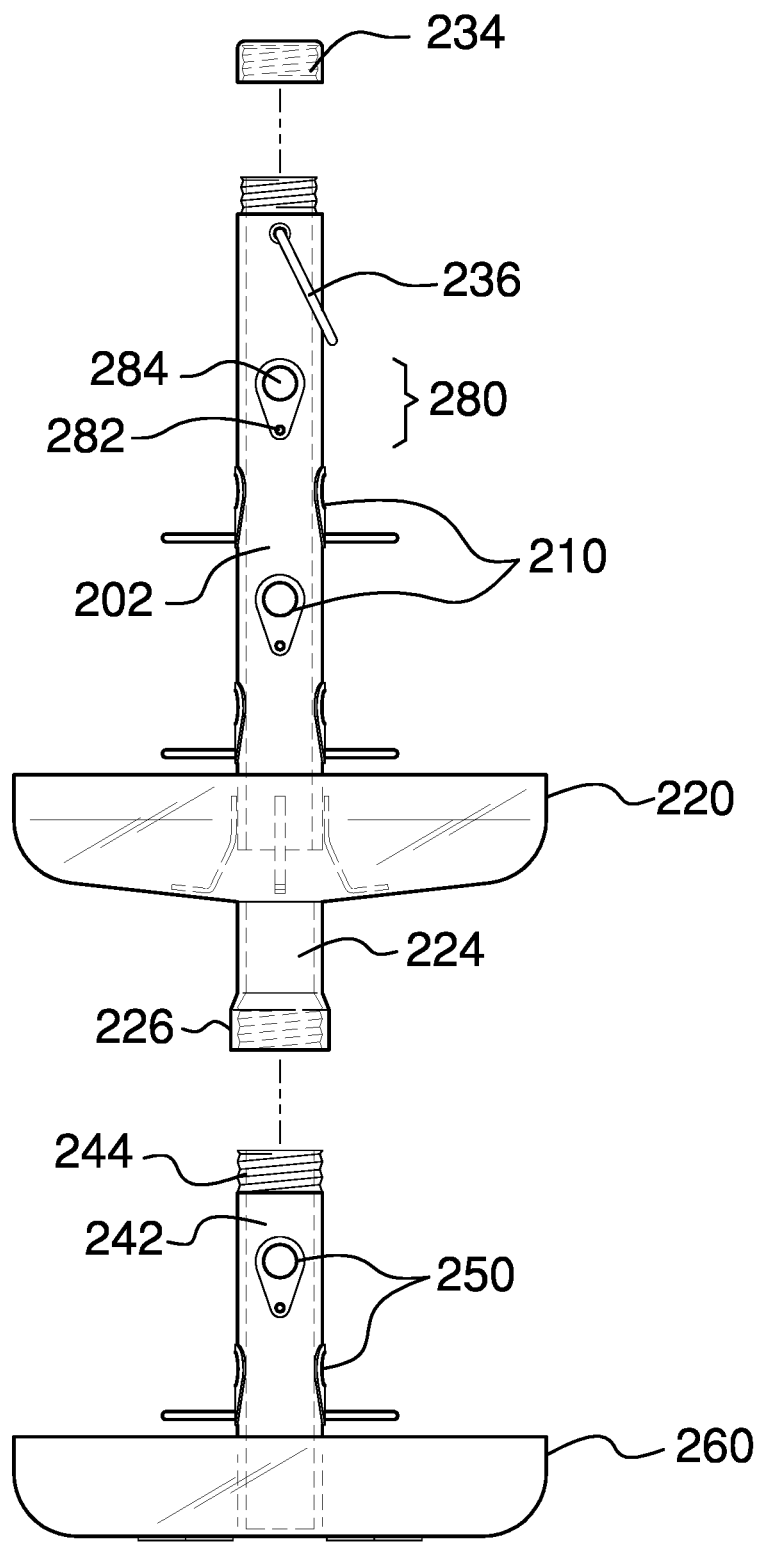
FIG. 2 is an exploded view of an embodiment of the disclosure.
Figure 3:
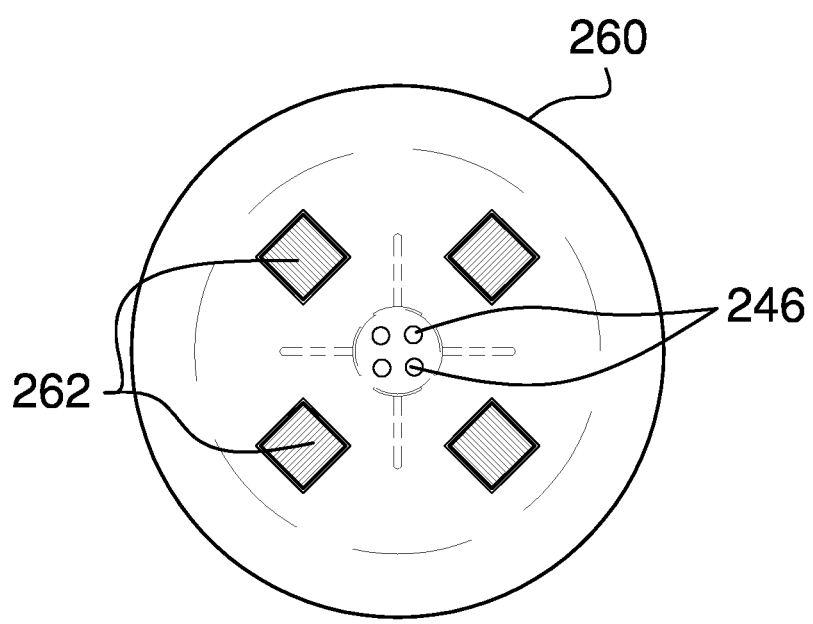
FIG. 3 is a bottom view of an embodiment of the disclosure.
Figure 4:
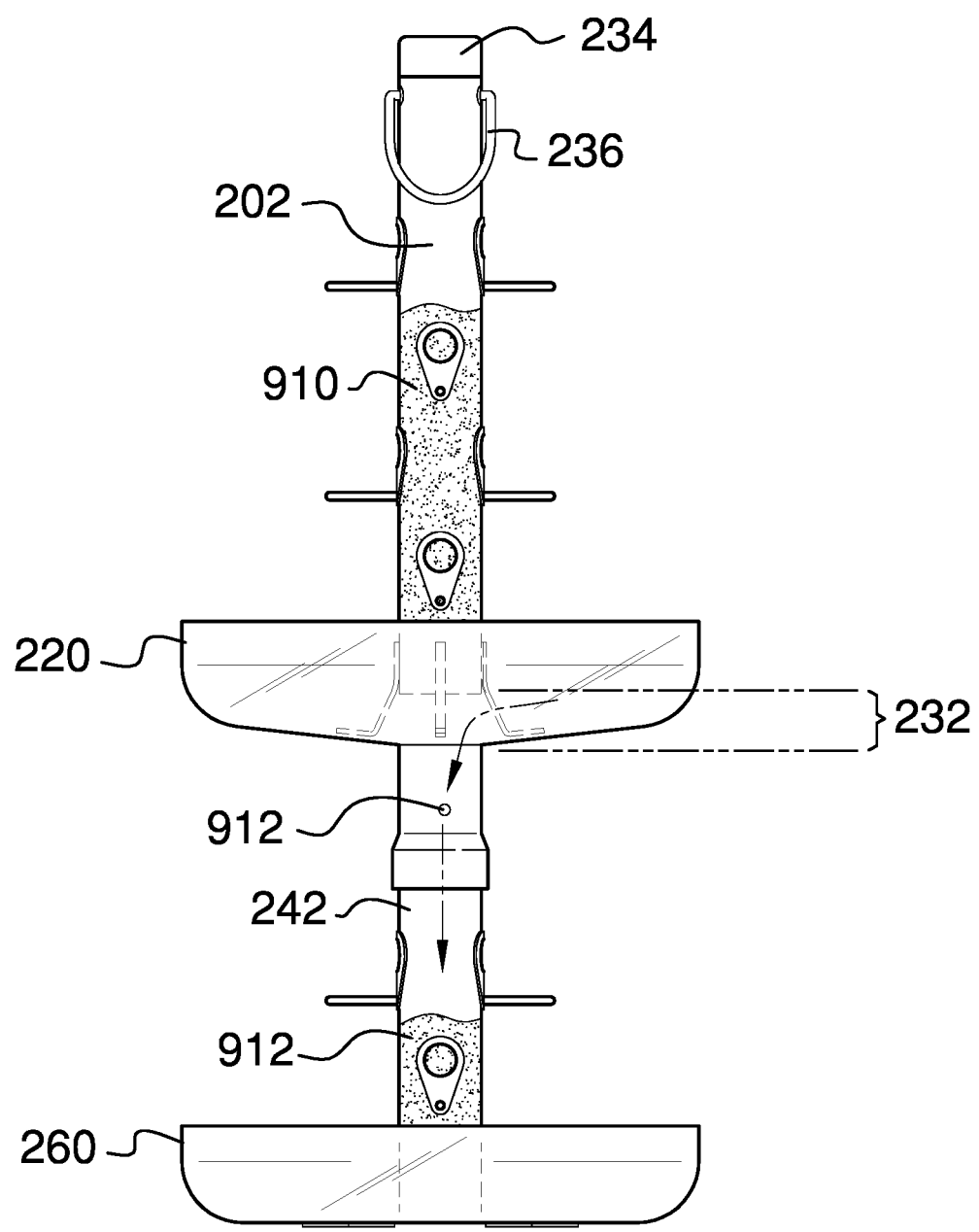
FIG. 4 is a side view of an embodiment of the disclosure.

Detailed reference will now be made to a first potential embodiment of the disclosure, which is illustrated in FIGS. 1 through 4.

The bird feeder with a lower seed catching tray 100 (hereinafter invention) comprises an upper feeder 200 and a lower feeder 240. The top of the lower feeder 240 may be coupled to the bottom of the upper feeder 200. The upper feeder 200 may be stocked with bird seed 910. The upper feeder 200 may be adapted to dispense the bird seed 910 to one or more birds from a plurality of upper feeding stations 210 located on an upper seed tube 202. The bird seed 910 dropped by the one or more birds feeding at the upper feeder 200 may be collected by an upper bowl 220 of the upper feeder 200 and may be funneled into the lower feeder 240 where the bird seed 910 may be dispensed a second time.

The upper feeder 200 may comprise the upper seed tube 202, the plurality of upper feeding stations 210, the upper bowl 220, one or more standoffs 230, and a cap 234. The upper feeder 200 may be operable to hold the bird seed 910 within the upper seed tube 202 and to dispense the bird seed 910 via the plurality of upper feeding stations 210.

The upper seed tube 202 may be a hollow cylindrical container for the bird seed 910. The bottom end of the upper seed tube 202 may be sealed to prevent the bird seed 910 from falling through the upper seed tube 202. The top of the upper seed tube 202 may be open such that the bird seed 910 may be placed into the upper seed tube 202 by removing the cap 234 and pouring the bird seed 910 into the upper seed tube 202. The upper seed tube 202 may be transparent such that the level of the bird seed 910 within the upper seed tube 202 may be observed from outside of the upper seed tube 202.

The plurality of upper feeding stations 210 may be adapted to dispense the bird seed 910 to the one or more birds. Each of the plurality of upper feeding stations 210 may be coupled to the upper seed tube 202 at one of a plurality of upper tube apertures.

The upper bowl 220 may be a saucer-shaped tray located at the bottom of the upper feeder 200. The upper bowl 220 may be adapted to catch the bird seed 910 that is dropped by the one or more birds feeding at the upper feeder 200. The center of the upper bowl 220 may comprise a funnel aperture 222. The bottom surface of the upper bowl 220 may slope downwards towards the funnel aperture 222 such that dropped seeds 912 may slide towards the funnel aperture 222. The bottom center of the upper bowl 220 may project downwards to form a funnel neck 224. The funnel neck 224 may be a hollow cylinder that is open at both ends. The opening at the top end of the funnel neck 224 may be the funnel aperture 222. The dropped seeds 912 may exit the upper feeder 200 by dropping through the funnel aperture 222 and passing through the funnel neck 224 to the lower feeder 240.

The bottom end of the funnel neck 224 may comprise an upper threaded coupler 226. The upper threaded coupler 226 may be operable to detachably couple to a lower threaded coupler 244 located on the lower feeder 240 such that the lower feeder 240 may be suspended below the upper feeder 200.

The one or more standoffs 230 may elevate the upper seed tube 202 above the upper bowl 220 such that a gap 232 is formed between the upper seed tube 202 and the upper bowl 220. The dropped seeds 912 may pass through the gap 232 to reach the funnel aperture 222.

The cap 234 may removably couple to the upper end of the upper seed tube 202 to keep water out of the upper seed tube 202. The upper seed tube 202 may comprise a hanger loop 236 such that the invention 100 may be hung for use. The hanger loop 236 may be pivotably coupled to the top of the upper seed tube 202.

The lower feeder 240 may comprise a lower seed tube 242, a plurality of lower feeding stations 250, and a lower bowl 260. The lower feeder 240 may be operable to hold the dropped seeds 912 within the lower seed tube 242 and to dispense the dropped seeds 912 via the plurality of lower feeding stations 250.

The lower seed tube 242 may be a hollow cylindrical container for the dropped seeds 912. The bottom end of the upper seed tube 202 may be sealed to prevent the dropped seeds 912 from falling through the lower seed tube 242. The top of the lower seed tube 242 may be open such that the dropped seeds 912 arriving from the upper feeder 200 may enter the lower seed tube 242. The lower seed tube 242 may be transparent such that the level of the dropped seeds 912 within the lower seed tube 242 may be observed from outside of the lower seed tube 242. In some embodiments, the lower seed tube 242 may comprise one or more drainage holes 246 located at the bottom of the lower seed tube 242, surrounding the lower side of the lower seed tube 242, or both such that any water or condensation that collects within the lower seed tube 242 may drain out of the lower seed tube 242.

The top of the lower seed tube 242 may comprise the lower threaded coupler 244. The lower threaded coupler 244 may mate with the upper threaded coupler 226 such that the lower feeder 240 may be suspended below the upper feeder 200.

The plurality of lower feeding stations 250 may be adapted to dispense the dropped seeds 912 to the one or more birds. Each of the plurality of lower feeding stations 250 may be coupled to the lower seed tube 242 at one of a plurality of lower tube apertures.

An individual feeding station 280 selected from the plurality of upper feeding stations 210 and the plurality of lower feeding stations 250 may comprise a perch 282 and a seed aperture 284. The perch 282 may be adapted for a bird to rest upon while eating. The seed aperture 284 may be operable to provide access to the bird seed 910 or the dropped seeds 912 located within the upper seed tube 202 or the lower seed tube 242.

The lower bowl 260 may be a saucer-shaped tray located at the bottom of the lower feeder 240. The lower bowl 260 may be adapted to catch the bird seed 910 that is dropped by the one or more birds feeding at the lower feeder 240. The dropped seeds 912 may collect in the lower bowl 260 and may be eaten by the one or more birds from the lower bowl 260. The lower bowl 260 may comprise a plurality of drains 262. The plurality of drains 262 may be operable to remove water or condensation from the lower bowl 260. In some embodiments, the plurality of drains 262 may be a mesh material coupled to apertures located on the bottom surface of the lower bowl 260.

In use, the upper feeder 200 may be stocked with bird seed 910 by removing the cap 234, pouring the bird seed 910 into the top of the upper seed tube 202, and replacing the cap 234. The invention 100 may be hung from a feeder pole or tree branch via the hanger loop 236. One or more birds may access the bird seed 910 via the plurality of upper feeding stations 210. The bird seed 910 dropped by the one or more birds may fall into the upper bowl 220 and may slide towards the center of the upper bowl 220 where the dropped seeds 912 may fall through the funnel neck 224 into the lower seed tube 242. The one or more birds may access the dropped seeds 912 via the plurality of lower feeding stations 250 such that few seeds are wasted.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used herein, the words "couple", "couples", "coupled" or "coupling", may refer to connecting, either directly or indirectly, and does not necessarily imply a mechanical connection.

As used in this disclosure, a "cylinder" may be a geometric structure defined by two identical flat and parallel ends, also commonly referred to as bases, which are circular in shape and connected with a single curved surface which may be referred to as the face. The axis of the cylinder is formed by the straight line that connects the center of each of the two identical flat and parallel ends of the cylinder. Unless otherwise stated within this disclosure, the term cylinder specifically indicates a right cylinder which is defined as a cylinder wherein the curved surface perpendicularly intersects with the two identical flat and parallel ends.

As used herein, "mate" may refer to a retaining, coupling, connecting, interlocking, or interfacing at a predefined interface.

As used in this disclosure, "transparent" may refer to a material that allows light to pass through the material without significant scattering such that an object can be clearly seen through the material.

As used in this disclosure, a "tray" may be a flat platelike structure that has a raised rim formed around the perimeter for the purpose of containing fluids within the structure of the tray. Trays will generally give an impression of being a shallow containment device. Trays are often used for carrying food and drink or for holding small items.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A bird feeder with a lower seed catching tray comprising:
    an upper feeder and a lower feeder;
    wherein the top of the lower feeder is coupled to the bottom of the upper feeder;
    wherein the upper feeder is stocked with bird seed;
    wherein the upper feeder is adapted to dispense the bird seed to one or more birds from a plurality of upper feeding stations located on an upper seed tube;
    wherein the bird seed dropped by the one or more birds feeding at the upper feeder is collected by an upper bowl of the upper feeder and is funneled into the lower feeder where the bird seed is dispensed a second time.

2. The bird feeder with a lower seed catching tray according to claim 1
    wherein the upper feeder comprises the upper seed tube, the plurality of upper feeding stations, the upper bowl, one or more standoffs, and a cap;
    wherein the upper feeder is operable to hold the bird seed within the upper seed tube and to dispense the bird seed via the plurality of upper feeding stations.

3. The bird feeder with a lower seed catching tray according to claim 2
    wherein the upper seed tube is a hollow cylindrical container for the bird seed;
    wherein the bottom end of the upper seed tube is sealed to prevent the bird seed from falling through the upper seed tube;
    wherein the top of the upper seed tube is open such that the bird seed is placed into the upper seed tube by removing the cap and pouring the bird seed into the upper seed tube.

4. The bird feeder with a lower seed catching tray according to claim 3
    wherein the upper seed tube is transparent such that the level of the bird seed within the upper seed tube is observed from outside of the upper seed tube.

5. The bird feeder with a lower seed catching tray according to claim 4
    wherein the plurality of upper feeding stations are adapted to dispense the bird seed to the one or more birds;
    wherein each of the plurality of upper feeding stations are coupled to the upper seed tube at one of a plurality of upper tube apertures.

6. The bird feeder with a lower seed catching tray according to claim 5
    wherein the upper bowl is a saucer-shaped tray located at the bottom of the upper feeder;
    wherein the upper bowl is adapted to catch the bird seed that is dropped by the one or more birds feeding at the upper feeder;
    wherein the center of the upper bowl comprises a funnel aperture;
    wherein the bottom surface of the upper bowl slopes downwards towards the funnel aperture such that dropped seeds slide towards the funnel aperture;
    wherein the bottom center of the upper bowl **projects downwards to form a funnel neck.

7. The bird feeder with a lower seed catching tray according to claim 6
    wherein the funnel neck is a hollow cylinder that is open at both ends;
    wherein the opening at the top end of the funnel neck is the funnel aperture;
    wherein the dropped seeds exit the upper feeder by dropping through the funnel aperture and passing through the funnel neck to the lower feeder.

8. The bird feeder with a lower seed catching tray according to claim 7
    wherein the bottom end of the funnel neck comprises an upper threaded coupler;
    wherein the upper threaded coupler is operable to detachably couple to a lower threaded coupler located on the lower feeder such that the lower feeder is suspended below the upper feeder.

9. The bird feeder with a lower seed catching tray according to claim 8
    wherein the one or more standoffs elevate the upper seed tube above the upper bowl such that a gap is formed between the upper seed tube and the upper bowl;
    wherein the dropped seeds pass through the gap to reach the funnel aperture.

10. The bird feeder with a lower seed catching tray according to claim 9
    wherein the cap removably couples to the upper end of the upper seed tube to keep water out of the upper seed tube;
    wherein the upper seed tube comprises a hanger loop;
    wherein the hanger loop is pivotably coupled to the top of the upper seed tube.

11. The bird feeder with a lower seed catching tray according to claim 10
    wherein the lower feeder comprises a lower seed tube, a plurality of lower feeding stations, and a lower bowl;

wherein the lower feeder is operable to hold the dropped seeds within the lower seed tube and to dispense the dropped seeds via the plurality of lower feeding stations.

12. The bird feeder with a lower seed catching tray according to claim 11
   wherein the lower seed tube is a hollow cylindrical container for the dropped seeds;
   wherein the bottom end of the upper seed tube is sealed to prevent the dropped seeds from falling through the lower seed tube;
   wherein the top of the lower seed tube is open such the dropped seeds arriving from the upper feeder enter the lower seed tube.

13. The bird feeder with a lower seed catching tray according to claim 12
   wherein the lower seed tube is transparent such that the level of the dropped seeds within the lower seed tube are observed from outside of the lower seed tube.

14. The bird feeder with a lower seed catching tray according to claim 13
   wherein the lower seed tube comprises one or more drainage holes located at the bottom of the lower seed tube, surrounding the lower side of the lower seed tube, or both such that any water or condensation that collects within the lower seed tube drains out of the lower seed tube.

15. The bird feeder with a lower seed catching tray according to claim 13
   wherein the top of the lower seed tube comprises the lower threaded coupler;
   wherein the lower threaded coupler mates with the upper threaded coupler such that the lower feeder is suspended below the upper feeder.

16. The bird feeder with a lower seed catching tray according to claim 15
   wherein the plurality of lower feeding stations are adapted to dispense the dropped seeds to the one or more birds;
   wherein each of the plurality of lower feeding stations are coupled to the lower seed tube at one of a plurality of lower tube apertures.

17. The bird feeder with a lower seed catching tray according to claim 16
   wherein an individual feeding station selected from the plurality of upper feeding stations and the plurality of lower feeding stations comprise a perch and a seed aperture;
   wherein the perch is adapted for a bird to rest upon while eating;
   wherein the seed aperture is operable to provide access to the bird seed or the dropped seeds.

18. The bird feeder with a lower seed catching tray according to claim 17
   wherein the lower bowl is a saucer-shaped tray located at the bottom of the lower feeder;
   wherein the lower bowl is adapted to catch the bird seed that is dropped by the one or more birds feeding at the lower feeder.

19. The bird feeder with a lower seed catching tray according to claim 18
   wherein the lower bowl comprises a plurality of drains;
   wherein the plurality of drains are operable to remove water or condensation from the lower bowl.

20. The bird feeder with a lower seed catching tray according to claim 19
   wherein the plurality of drains are a mesh material coupled to apertures located on the bottom surface of the lower bowl.

* * * * *